Patented July 11, 1939

2,165,421

UNITED STATES PATENT OFFICE 2,165,421

HARDENING PHOTOGRAPHIC EMULSIONS

Samuel E. Sheppard and Robert C. Houck, Rochester, N. Y., assignors to Eastman Kodak Company, Rochester, N. Y., a corporation of New Jersey No Drawing. Application September 25, 1936, Serial No. 102,547

13 Claims. (Cl. 95—7)

This invention relates to photographic gelatin and to a method for producing photographic gelatin and emulsions free from objectionable fogging and "after hardening."

It is customary to treat photographic gelatin or emulsion solutions or layers with a hardening agent in order to increase the resistance of the gelatin or emulsion layer to swelling or softening, particularly when processed at increased temperatures. Compounds which have been used for this purpose are chrome alum, formaldehyde, and other reagents. In our prior Patent No. 2,059,817, granted November 3, 1936, we have also disclosed the use of hydroxy aldehydes up to and including the pentoses for this purpose.

In many cases the degree of hardening produced by the addition of these hardening agents, as indicated by the melting point, swelling, behavior on photographic processing of the gelatin, and in other ways, is not complete after drying the product, but a greater or less amount of so-called "after hardening" occurs on storage of the plates or films. This "after hardening" gives rise to a product whose properties are variable with time, unless an inconveniently long period of storage prior to use is involved. This hardening may continue through a period of months and may equal or surpass in degree the initial hardening on first drying. One consequence of this is generally a reduction in speed of development, but other objectionable changes in photographic properties may result, such as fogging of the plate or film.

It is therefore an object of the present invention to provide a photographic gelatin or emulsion which on storage will be stable against change in sensitometric properties or physical properties, such as hardening and swelling. A further object is to provide a photographic emulsion which will not fog on storage. A still further object is to provide a method of eliminating "after hardening" in photographic emulsions. A still further object is to provide a photographic emulsion which will be resistant to relatively high processing temperatures without fogging or desensitizing.

These objects are accomplished according to the present invention by incorporating in the gelatin or emulsion an aldehyde hardening agent together with one or more of a class of compounds which alone possess little or no hardening effect upon gelatin or gelatino-silver halide emulsions, but in conjunction with the aldehyde both accelerate the hardening action with elimination or reduction of "after hardening" and also inhibit the tendency to fog production on storage or incubation. These added substances comprise homocyclic carbon compounds containing one or more phenolic hydroxyl groups.

The aldehyde hardening agents may include any of the well known compounds, such as formaldehyde, acetaldehyde, glycolaldehyde, aldol or the straight-chain compounds disclosed in our prior Patent No. 2,059,817, granted November 3, 1936, such as arabinose.

The added homocyclic carbon compounds which we have found suitable include phenolic compounds, such as mono-nuclear, mono-hydroxy, dihydroxy and trihydroxy derivatives. These may be substituted with one or more alkyl, alkoxy, sulfonic acid, aldehyde, or carboxyl groups or hydrogen atoms. Nitro or nitroso groups are undesirable because they produce excessive absorption of actinic light.

Among the di-hydroxylated mono-nuclear bodies the 1:3 compound (resorcinol) and its homologues are preferred to the 1:2 and 1:4 dihydroxy compounds because of the greater stability, decreased tendency to fog the emulsion, and reduced tendency to coloration by aerial oxidation of 1:3 di-hydroxy compounds. Similarly, among the tri-hydroxy benzenes, we prefer the symmetrical or 1:3:5 compound to 1:2:3 tri-hydroxy benzene (pyrogallol) or 1:2:4 tri-hydroxy benzene (oxy-hydroquinone).

We also regard the cognate naphthalene analogues as within the scope of our invention where they do not introduce objectionable light absorption. The hydroxy naphthalene compounds may be substituted in the same way as the mono-nuclear compounds.

As is well known it is customary to digest or ripen a gelatino-silver halide photographic emulsion by the action of heat or by digestion with ammonia before coating the emulsion on the support. According to our invention the aldehyde hardening agent and the additional phenolic compound are incorporated by mixing them with the photographic emulsion at any stage after the digestion, either before or after coating the emulsion on the support. The hardening agent and phenolic compound may be added to plain gelatin, such as that used for coating photographic supports, at any stage.

The following table illustrates the degree of hardening obtained by the use of various phenolic compounds in combination with various aldehyde hardening agents, together with the hardening obtained by the aldehyde alone. The hardening is measured by the melting point of the gelatin.

| Concentration of aldehyde (on weight of gelatin) | Concentration of phenol body or derivative (on weight of gelatin) | pH | M. P. °C. Aldehyde only | M. P. °C. Aldehyde + phenol body |
|---|---|---|---|---|
| 0.15% formaldehyde | 0.2% phenol | 6.0 | 62 | 74 |
| 0.1% formaldehyde | .05% o-cresol | 6.0 | 41 | 55 |
| 0.1% formaldehyde | .25% m-cresol | 6.0 | 41 | 65 |
| .05% formaldehyde | .10% phloroglucinol | 6.0 | 42–44 | 71 |
| .1% formaldehyde | .1% phloroglucinol | 4.9 | 42–44 | 85 |
| .1% formaldehyde | .2% thymol | 6.0 | 41 | 50 |
| .1% formaldehyde | .5% sodium phenol sulfonate | 6.0 | 41 | 58 |
| .15% formaldehyde | .2% salicylic aldehyde | 6.0 | 41 | 72 |
| .1% formaldehyde | 0.5% resorcinol | 6.7 | ...... | 68 |
| .05% formaldehyde | .4% resorcyl aldehyde | 4.9 | ...... | 60 |
| 4.0% aldol | 4.0% resorcinol | 6.0 | 40 | 55 |
| 0.5% aldol | 0.5% resorcyl aldehyde | 6.0 | 34 | 38 |
| 1.0% aldol | 1.0% resorcyl aldehyde | 6.0 | 34 | 44 |
| 2.0% aldol | 0.5% resorcyl aldehyde | 6.0 | 36 | 62 |
| 1.0% aldol | 3.0% phloroglucinol | 6.0 | 34 | 40 |
| 2.0% aldol | 0.4% phloroglucinol | 6.0 | 34 | 40 |
| 1.0% aldol | 1.0% phloroglucinol | 8.0 | 34 | 49 |
| 0.4% glycol aldehyde | 0.2% resorcylic aldehyde | 6.0 | 39 | 63 |
| 0.4% glycol aldehyde | 0.5% phloroglucinol | 8.0 | 65–70 | 80–84 |
| 1.0% arabinose | 1% resorcinol | 6.7 | 34 | 38 |

The following specific examples illustrate the variation in hardening obtained, as indicated by the melting point of the gelatin, upon addition of an aldehyde hardening agent together with varying amounts of phenolic compounds.

Example I

Effect of resorcinol on hardening of gelatin by formaldehyde.
Deashed gelatin—pH adjusted to 6.7.
Formaldehyde 0.1 per cent of gelatin.

| Amount of resorcinol (on weight of gelatin) | Melting point 24 hours °C. |
|---|---|
| 0.0% | 41 |
| 0.4% | 67 |
| 0.5% | 68 |
| 0.8% | 67 |
| 1.0% | 65 |

The sample without resorcin gradually hardens further, ultimately approaching much the same melting point as that attained by the mixtures. But this is only slowly attained (after-hardening) whereas the mixture gives nearly the maximum hardening at once. In addition, there is less fog on keeping with the mixture.

Example II

Effect of resorcinol on hardening of gelatino-silver-halide emulsion by formaldehyde.
Emulsion adjusted to pH 6.6.
Formaldehyde 0.1 per cent of gelatin in emulsion.

| Amount of resorcin (on weight of gelatin) | Melting point 24 hours °C. |
|---|---|
| 0.0% | 41.0 |
| 0.25% | 78.0 |
| 0.50% | 80.5 |
| 1.00% | 81.0 |
| 2.00% | 79.0 |
| 3.00% | 78.0 |
| 4.00% | 64.0 |
| 6.00% | 59.0 |

This example brings out another fact observed in relation to our invention, viz., that a rather broad but definite optimum concentration obtains for the accessory substance. Usually the increased hardening is obtained with quite small amounts of the phenolic body, and increase beyond the optimum again diminishes the hardening effect.

Example III

Effect of phloroglucinol on hardening of gelatin by formaldehyde.
Deashed gelatin at pH 6.7.
Formaldehyde 0.05 per cent of gelatin.

| Amount of phloroglucinol (on weight of gelatin) | Melting point 24 hours °C. |
|---|---|
| 0.0% | 43 |
| 0.0125% | 44 |
| 0.025% | 55 |
| 0.100% | 74 |
| 0.200% | 72 |
| 0.50% | 59 |
| 0.70% | 51 |
| 1.00% | 49 |
| 2.00% | 40 |
| 4.00% | 38 |
| 6.00% | 38 |

This example again shows well marked optimum concentration effect. This, however, is not objectionable to the practice of the invention, because there is still sufficient latitude for variations from the absolute optimum to be sufficiently effective.

Example IV

Effect of resorcylic aldehyde on hardening of gelatin by formaldehyde.
Gelatin adjusted to pH 4.9.
Formaldehyde 0.05 per cent of gelatin.

| Amount of resorcylic aldehyde (on weight of gelatin) | Melting point 24 hours °C. |
|---|---|
| 0.0% | 42 |
| 0.1% | 52 |
| 0.2% | 56 |
| 0.3% | 58 |
| 0.4% | 60 |

In addition to the phenolic compounds disclosed above we may use combinations of two phenolic compounds in certain cases. This has been found to be advantageous, particularly for reduction of fog.

The nature of the accessory hardening action is not known with certainty, but it is surmised that there occurs an initial condensation of the phenolic body with the aldehyde, and that the nascent molecules of this condensation product (much more active than independently synthesized condensation product) further condense with or tan the gelatin. The effect of excess of phenolic constituent as indicated in the above examples appears to be in harmony with this conception. While we believe this explanation of the reason for the action of the phenolic bodies in conjunction with hardening aldehydes to be as outlined, we do not regard this theory as essential to the practice of our invention.

The examples included in the above specification are not to be taken as limiting, since we regard our invention as coextensive with the scope of the appended claims.

What we claim is:

1. The method of producing a hardened photographic gelatin having slight after-hardening tendency which comprises uniformly mixing therewith prior to photographic processing an aliphatic aldehyde hardening agent and a homocylic carbon compound containing at least one nuclear hydroxy substituent group.

2. The method of producing a hardened photographic gelatin having slight after-hardening tendency which comprises uniformly mixing therewith prior to photographic processing an aliphatic aldehyde hardening agent and a hydroxy benzene.

3. The method of producing a hardened photographic gelatin having slight after-hardening tendency which comprises uniformly mixing therewith prior to photographic processing an aliphatic hardening agent and a phenol.

4. The method of producing a hardened gelatin having slight after-hardening tendency which comprises uniformly mixing therewith an aliphatic aldehyde hardening agent and a 1:3-dihydroxy benzene.

5. The method of producing a hardened gelatin having slight after-hardening tendency which comprises uniformly mixing therewith an aliphatic aldehyde hardening agent and resorcylic aldehyde.

6. The method of producing a hardened gelatin having slight after-hardening tendency which comprises uniformly mixing therewith an aliphatic aldehyde hardening agent and a 1:3:5-trihydroxy benzene.

7. The method of producing a hardened gelatin having slight after-hardening tendency which comprises uniformly mixing therewith an aliphatic aldehyde hardening agent and phloroglucinol.

8. In the manufacture of a stable gelatin photographic emulsion, the step of hardening said gelatin with an aliphatic aldehyde hardening agent and a homocylic carbon compound containing at least one nuclear hydroxy substituent group, the aldehyde hardening agent and the homocylic carbon compound being uniformly mixed with the emulsion prior to development.

9. In the manufacture of a stable gelatin photographic emulsion, the step of hardening said gelatin with formaldehyde and a meta-cresol, the formaldehyde and the m-cresol being uniformly mixed with the emulsion prior to development.

10. In the manufacture of a stable gelatin photographic emulsion, the step of hardening said gelatin with formaldehyde and thymol, the formaldehyde and the thymol being uniformly mixed with the emulsion prior to development.

11. In the manufacture of a stable gelatin photographic emulsion, the step of hardening said gelatin with formaldehyde and resorcyclic aldehyde, the formaldehyde and the resorcyclic aldehyde being uniformly mixed with the emulsion prior to development.

12. A photographic element comprising a transparent support and a gelatin emulsion thereon, said emulsion containing as hardening means an aliphatic aldehyde hardening agent and a homocylic carbon compound containing at least one nuclear hydroxy substituent group.

13. A photographic element comprising a transparent support and a gelatin emulsion thereon, said emulsion containing as hardening means 0.05% to 0.1% of formaldehyde and 0.1% to 0.5% of resorcylic aldehyde.

SAMUEL E. SHEPPARD.
ROBERT C. HOUCK.